United States Patent [19]

Dallas et al.

[11] 4,329,020
[45] May 11, 1982

[54] METHOD OF MANUFACTURING INVERSE FILTERS BY HOLOGRAPHIC TECHNIQUES

[75] Inventors: William J. Dallas, Hamburg; Rolf Linde, Haseldorf; Hermann Weiss, Hamburg, all of Fed. Rep. of Germany

[73] Assignee: U.S. Philips Corporation, New York, N.Y.

[21] Appl. No.: 116,692

[22] Filed: Jan. 30, 1980

[51] Int. Cl.³ .............................................. G02B 5/32
[52] U.S. Cl. ............................... 350/162 SF; 350/3.7; 350/320
[58] Field of Search ...................... 350/320, 3.7, 3.82, 350/3.83, 162 SF; 250/550; 356/71; 355/68, 69

[56] References Cited

U.S. PATENT DOCUMENTS 3,096,176 7/1963 Craig ...................................... 355/68
3,767,284 10/1973 Dammann ...................... 350/162 SF Primary Examiner—John K. Corbin
Assistant Examiner—Bruce Y. Arnold
Attorney, Agent, or Firm—Thomas A. Briody; Robert T. Mayer; Algy Tamoshunas

[57] ABSTRACT

Disclosed is a method of making an inverse filter wherein a single photographic plate is illuminated by the object and reference waves so as to expose the photographic material in the logarithmic portion of its transmittance versus illumination curve to thereby form a holographic image which upon development forms the inverse filter.

7 Claims, 3 Drawing Figures

METHOD OF MANUFACTURING INVERSE FILTERS BY HOLOGRAPHIC TECHNIQUES

The invention relates to a method of manufacturing inverse filters by holographic techniques.

It is generally known that in principle it is possible to enhance an image or to decode an encoded image by subsequent inverse optical filtering in the Fourier plane of a lens, see for example "Industrial Photography", May 19, 1970, pages 26 and further. However, currently the optical methods of inverse filtering are not frequently utilized, because the manufacture of such filters is intricate and time-consuming. In addition, the linear recording characteristic of the photographic material normally has a greatly limited dynamic range. If instead of this linearity requirement a specific non-linearity requirement is adopted, i.e. that the resulting amplitude transmittance of the material is proportional to the logarithm of the illumination, this would simplify manufacture of the inverse filter, but this does not suffice if the recording conditions are not adapted to this logarithmic non-linearity.

IEEE Spectrum, Vol. 9, No. 12, 1972, page 34, FIG. 7 describes a method of manufacturing an inverse filter in more detail. The light distribution required for the manufacture of such a filter is obtained by means of a difficult photographic process. An amplitude filter to be made for this purpose comprises two photographic plates, which must be manufactured after each other. When they are reinserted into the radiation path, they should be adjusted to each other and to the light distribution to be obtained. This poses an adjustment problem. Manufacture of the inverse filter in the first Fourier plane is not possible, because strictly speaking exactly that light distribution should be used for manufacturing the filter, which after leaving the second photographic plate N2 in FIG. 7 is produced directly behind the base. For this reason a second Fourier arrangement is required, which produces said light distribution in the second Fourier plane and it is not until then that the inverse filter can be manufactured by known holographic techniques.

It is the object of the invention to provide a simplified manufacturing method of the type, mentioned in the preamble, by means of which inverse filters in a wide dynamic range can be obtained.

This object is achieved in that for the filter hologram a recording material with a logarithmic characteristic is employed and for the illumination a reference/object-wave intensity ratio is selected which is not unity.

This ensures that the manufacture of a two-component amplitude filter as well as an additional second Fourier arrangement may be dispensed with and thus the associated adjustment problem is eliminated. On the contrary, the logarithmic recording of the amplitude filter and of the hologram required for the inverse filter is effected in the first Fourier plane on one and the same photographic plate at the same location. All inverse filters not manufactured in accordance with the inventive method, however, require a second plate/amplitude filter associated with a second Fourier arrangement or at least comprise a sandwich of amplitude filters and hologram.

If during the manufacture of the filter only one holographic recording is used, it is advantageous in the case of coherent radiation to select the intensity of the reference wave lower than the intensity of the object wave.

It is also possible to make the filter hologram by double illumination, a first illumination being effected with highly coherent light and with an intensity of the reference wave which is higher than that of the object wave, and a second illumination (post-illumination) with the object wave only, the intensity of the object wave being higher than the intensity of the illumination with reference wave.

Filter holograms can also be obtained with semicoherent light, the intensity of the reference beam being high and its degree of coherence being low.

It is essential that the illumination is adapted to the photographic material in such a way that only the logarithmic portion of the characteristic of the material is used. As the illumination is greatly influenced by the object beam, the illumination cannot always be adapted over the entire recording area. in those cases in which the object wave does not exhibit excessive fluctuations, but the object spectrum is comparatively uniform, the invention is of particularly great advantage.

Such a special case occurs in the case of imaging with encoded sources, as for example described in German patent application No. P 24 14 322.4. A superposition image produced by a plurality of sources is subsequently processed in order to obtain a decoded object. The decoding in the form of an autocorrelation only yields an approximated reconstruction of the object, whilst by inverse filtering the object is reconstructed in an ideal manner. The objectwave functions in this case are so low and spatially distributed in such a way that inverse filters manufactured in accordance with the novel method are particularly suitable for decoding.

The invention will be described in more detail with reference to the drawing. In the drawing.

Figure 1:
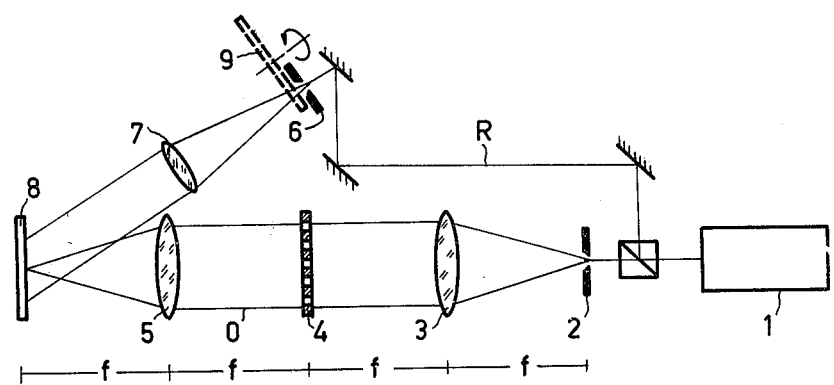
FIG. 1 shows an arrangement for recording the holographic filter.

In accordance with FIG. 1 the light is produced by a laser 1 and is spatially filtered by means of a pinhole diaphragm 2. Lens 3, which is situated at a distance equal to the focal length f from the pinhole diaphragm 2, converts the spherical wave into a plane wave and illuminates the object 4, which is also situated at a distance f from lens 3.

Figure 3:
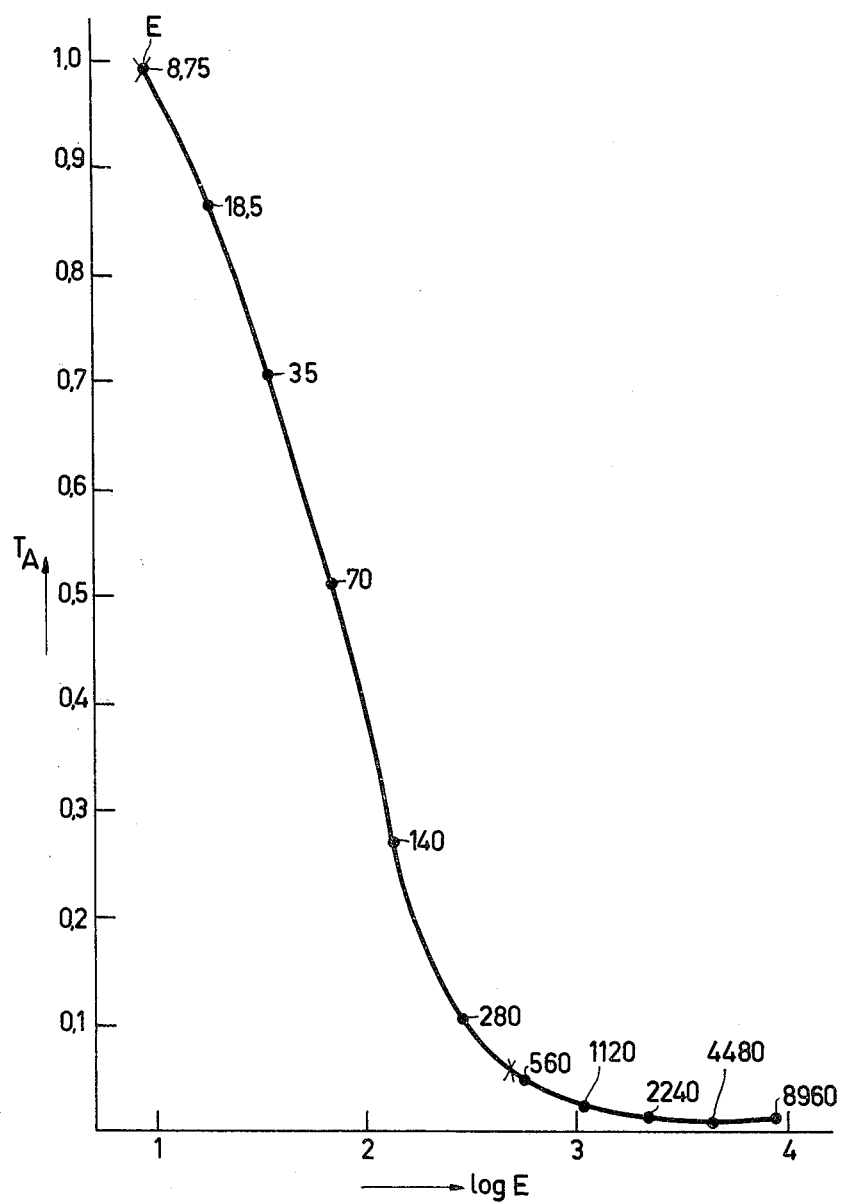
FIG. 3 represents the transmittance/illumination curve of a photographic material as a function of the logarithmic illumination.

The lens 5 effects a Fourier transformation of the object wave O in the plane of the holographic recording material 8 having a logarithmic recording characteristic (FIG. 3).

The reference wave R, which is also generated by the laser 1, is spatially filtered by the pinhole diaphragm 6, the resulting spherical wave being converted into a plane wave by means of the lens 7.

Figure 2:
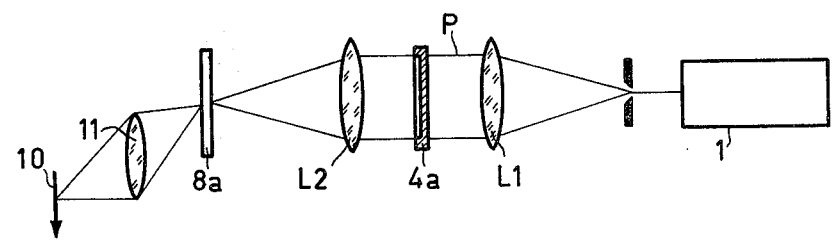
FIG. 2 shows an arrangement for filtering an image.

The reference wave R and the object wave O illuminate the recording material. A rotating ground-glass plate 9 is inserted into the reference radiation path, if semicoherent light is used. After development of the recording material 8 the inverse filter now obtained can be used as shown in FIG. 2. The object 4a which is to be filtered, is optically Fourier-transformed. A wave illuminates the inverse filter 8a. The wave emanating from the filter is Fourier-transformed with the lens 1 as a result of which the filtered object 10 is obtained. FIG. 3 shows a characteristic for a recording material used for manufacture of inverse filters. Of the typical photographic emulsions used for holographic purposes, the linear range is employed and the dynamic range is approximately a factor 4, whilst on the logarithmic characteristic the dynamic range is a factor 50.

The illumination for the holographic recording is then $$E = \psi[1 + a^2 + 2a \cos \theta], \quad (1)$$

where $\psi$ is the reference-wave illumination, a the value of the object-wave-to reference-wave ratio, and $\theta$ the phase angle between the object and reference wave.

It is known that the periodicity of the angle $\theta$ may be used to describe the amplitude transmittance of the hologram as a Fourier series, i.e.

$$T(E) = \sum_{m=-\infty}^{+\infty} C_m(a, \phi) e^{im\theta} \quad (2)$$

in which $$C_m = \frac{1}{2\pi} \int_0^{2\pi} T(E) e^{-im\theta} d\theta \quad (3)$$

As the reference phase comprises a carrier frequency, each term of this Fourier series will correspond to a diffraction order of the hologram. The $-1$ diffraction order is selected as the filter order, so that the effective filter transmittance is given by $$\tilde{F} = C_{-1}(a,\psi) e^{-i\Phi_n} \quad (4)$$

where $\Phi_n$ is the phase of the object wave.

For a logarithmic non-linearity $$T(E) = T_o - T_1 \ln(E), \quad (5)$$

where $T_o$, $T_1$ are constants, a corresponding Fourier series $C_m$ can be derived which corresponds to an inverse filter hologram which has been illuminated once. In order to satisfy this condition, a reference wave is required during the illumination of the hologram, whose intensity is low relative to that of the object wave. This reference/objectwave ratio is exactly the opposite of that in the case of the formation of hologram with highly coherent light in accordance with prior methods.

However, when the hologram is illuminated twice in succession, first with an object-to-reference wave ratio as is customary for the formation of optimum holograms and subsequently post-illuminated with the object wave, the total illumination will become $$E = \psi[1 + (1+b)a^2 + 2a \cos \theta] \quad (6)$$

where b represents a constant which is proportional to the post-illumination.

If $a << 1$, and $(1+b) >> a^{-\frac{1}{2}}$ the filter function will become $$\tilde{F} = \left[ \frac{\tilde{r}}{(1+b)} \right] T_0 \cdot \frac{1}{\tilde{u}} \text{ (object wave)} \quad (7)$$

$$\tilde{F} = \text{const.} \cdot \frac{1}{\tilde{u}} \text{ (object wave)} \quad (8)$$

because the reference wave $\tilde{r}$, $T_o$ and b are constants.

Accordingly, if the holographic plate is illuminated twice in succession, once with a high-intensity reference beam, i.e. with an object-to-reference wave ratio as is customary for the manufacture of holograms, and once without reference wave, the object illumination then being intense in comparison with the illumination with the reference beam, this also yields an inverse filter.

It is alternatively possible to manufacture a filter with semicoherent light, i.e. the reference beam is only spatially semicoherent relative to the object beam. Such a semicoherence can be obtained by inserting a rotating frosted-glass plate in the path of the reference beam instead of the pinhole diaphragm 6 in FIG. 2. If the hologram is then illuminated with semicoherent light, the reference beam having high intensity and low degree of coherence, this also yields an inverse filter.

The arrangement represented in FIG. 2 may for example also be employed as a device for decoding superposition images of a three-dimensional object (not shown), which are recorded from a plurality of radiation source positions and from different perspectives. A superposition image 4a, comprising a plurality of superimposed perspective images, is then arranged between the lenses L1 and L2 and is traversed by the parallel beam P. The filter hologram 8a (inverse filter) located in the Fourier plane of the lens L2 then serves for decoding the superposition image 4a or for reconstructing layer images of the object, if the filter hologram is observed via lens 11. For this purpose the coordinates of the uniform distribution of the radiation source positions are then stored in the filter hologram 8a at a reduced scale. Storage may be realized with the aid of the arrangement shown in FIG. 1, the object 4 being replaced by a pinhole camera recording of the radiation sources (compare DE-PS No. 24 14 322).

What is claimed is:

1. In a method for manufacturing inverse filters by holographic techniques wherein a plate provided with photographic material having a response such that its transmittance versus illumination characteristics define a curve having linear and logarithmic portions is illuminated by a reference wave and an object wave emanating from an object illuminated by a light beam, the improvement wherein a single photographic plate provided with said photographic material is illuminated with the reference and object waves so as to expose said material in the logarithmic portion of the response curve thereof to produce a holographic image which upon development forms the inverse filter.

2. The method according to claim 1 wherein the reference and object waves are coherent and the reference wave has an intensity lower than the intensity of the object waves.

3. The method according to claim 1 wherein during said exposure the photographic plate is first illuminated with highly coherent reference and object waves with the reference wave having a higher intensity then the intensity of the object wave and, subsequent to illumination with the reference and object waves, the photographic plate is illuminated only with the object wave having an intensity higher than the intensity of the reference wave during the previous illuminating step.

4. The method according to claim 1 wherein the reference wave has a low degree of coherence and an intensity higher than the intensity of the object wave.

5. The method according to claim 4 wherein the low degree of coherence of the reference wave is obtained by extending the optical path traversed by the reference wave relative to the optical path traversed by the object wave.

6. The method according to claim 4 including the step of filtering said reference wave by passing it through a pinhole diaphragm.

7. The method according to claim 4 including the step of positioning a rotating frosted glass plate in the path traversed by said reference wave.

* * * * *